(12) United States Patent
Dwork

(10) Patent No.: US 6,948,011 B1
(45) Date of Patent: Sep. 20, 2005

(54) ALTERNATE REGISTER MAPPING

(75) Inventor: Jeffrey Dwork, San Jose, CA (US)

(73) Assignee: Advanced Micro Devices, Sunnyvale, CA (US)

( * ) Notice: Subject to any disclaimer, the term of this patent is extended or adjusted under 35 U.S.C. 154(b) by 0 days.

(21) Appl. No.: 09/481,388

(22) Filed: Jan. 12, 2000

Related U.S. Application Data

(60) Provisional application No. 60/169,271, filed on Dec. 7, 1999.

(51) Int. Cl.$^7$ .............................................. G06F 3/00
(52) U.S. Cl. ......................... 710/38; 710/710; 710/1; 710/23; 710/36; 711/111; 711/147; 711/202; 711/203; 711/211; 713/2
(58) Field of Search ............................ 710/23, 36, 38, 710/1; 711/147, 211, 111, 203, 202; 713/2

(56) References Cited

U.S. PATENT DOCUMENTS

| | | | | |
|---|---|---|---|---|
| 5,278,973 A | * | 1/1994 | O'Brien ...................... | 717/168 |
| 5,625,796 A | * | 4/1997 | Kaczmarczyk et al. ..... | 711/168 |
| 5,784,582 A | * | 7/1998 | Hughes ...................... | 710/117 |
| 5,887,163 A | * | 3/1999 | Nguyen et al. ................ | 713/2 |
| 5,987,605 A | * | 11/1999 | Hill et al. ...................... | 713/2 |
| 6,049,857 A | * | 4/2000 | Watkins ...................... | 711/207 |
| 6,079,016 A | * | 6/2000 | Park .............................. | 713/2 |
| 6,101,590 A | * | 8/2000 | Hansen ...................... | 711/203 |
| 6,249,519 B1 | * | 6/2001 | Rangachar .................. | 370/356 |
| 6,286,070 B1 | * | 9/2001 | Ohara ........................ | 710/113 |
| 6,381,682 B2 | * | 4/2002 | Noel et al. ................... | 711/153 |
| 6,421,765 B1 | * | 7/2002 | Poisner ...................... | 711/145 |
| 6,425,093 B1 | * | 7/2002 | Singh et al. .................. | 714/38 |
| 6,496,883 B2 | * | 12/2002 | Shigetomi et al. ............ | 710/74 |

* cited by examiner

Primary Examiner—Jeffrey Gaffin
Assistant Examiner—Niketa Patel
(74) Attorney, Agent, or Firm—McDermott Will & Emery LLP

(57) ABSTRACT

A novel method of providing alternate access to a storage element for holding a data element in a network interface. The storage element is accessed via a first access path when the network interface operates with a first type of software, and via a second access path when a second type of software is used. The first access path is allocated in response to a first address signal identifying a first register required by the first type of software to hold the data element. The second access path is allocated in response to a second address signal identifying a second register required by the second type of software to hold the data element.

19 Claims, 3 Drawing Sheets

ALTERNATE REGISTER MAPPING

RELATED APPLICATIONS

This application claims priority from U.S. Provisional Patent Application No. 60/169,271, filed Dec. 7, 1999, which is incorporated herein by reference.

FIELD OF THE INVENTION

The present invention relates to data processing, and more particularly, to method and system for providing alternate access to the same storage element in a register block.

BACKGROUND ART

The growth in computer applications that require heavy data traffic and the increasing availability of high-speed transmission lines and intelligent communication switches create a need for data communication networks able to manage a huge amount of data at high rates. Complex software that addresses high-performance requirements of data networks is used to manage communications between a CPU and network devices.

Such software may require that certain bits in a network device, such as control and status bits, be accessed in a specific way. For example, a particular bit is required to be located in a specific position in a particular register along with some other bits accessible during the same access operation or sequence of access operations.

Thus, to be able to operate with different types of software, a network device should store the same information in various registers. Separate control means should be provided to maintain consistency of bits corresponding to the same information.

Therefore, it would be desirable to enable a network device to operate with different types of software without storing the same information in different locations.

DISCLOSURE OF THE INVENTION

The present invention offers a novel method of providing alternate access to a storage element for holding a data element in a data processing system. In accordance with this method, the storage element is accessed via a first access path when a first type of software is used to operate a data processing system, and the storage element is accessed via a second access path when a second type of software is used.

In a preferred embodiment, the first access path may be allocated in response to a first address signal identifying a first register required by the first type of software to hold the data element. The second access path may be allocated in response to a second address signal identifying a second register required by the second type of software to hold the data element.

In accordance with a first aspect of the invention, the data processing system operable with at least two types of software comprises a host interface for providing address, data and control signals from a host, and a storage element for holding data accessible via the host interface. Alternate access circuitry is configured for providing access to the storage element so as to access the data as a first data element in the first register when the system operates with the first type of software, and as a second data element in the second register when the system operates with the second type of software.

In particular, the alternate access circuitry may be configured to perform writing data into the storage element in response to the first address signal supplied from the host interface to access the first register, and in response to the second address signal supplied from the host interface to access the second register.

Also, the alternate access circuitry may be configured to perform reading data from the storage element in response to the first address signal supplied from the host interface to access the first register, and in response to the second address signal supplied from the host interface to access the second register.

In accordance with a preferred embodiment of the invention, the alternate access circuitry may comprise a writing mutiplexer having a first input for supplying a first data element to the storage element when the system operates with the first type of software, and a second input for supplying a second data element to the storage element when the system operates with the second type of software. When a first select signal is asserted, the writing multiplexer passes the first data element to the storage element. When a second select signal is asserted, the writing multiplexer passes the second data element to the storage element. While the first select signal is asserted in response to the first address signal, the second select signal is asserted in response to the second address signal.

Also, the alternate access circuitry may comprise a first reading gate coupled to the storage element for outputting a first data element when the system operates with the first type of software, and a second reading gate coupled to the storage element for outputting a second data element when the system operates with the second type of software. The first reading gate may be configured to output the first data element in response to the first address signal, and the second reading gate may be configured to output the second data element in response to the second address signal.

In accordance with another aspect of the present invention, a network interface having a host interface and a storage element for holding a data element accessible via the host interface, is provided with alternate access circuitry coupled to the storage element for providing multiple paths for accessing the data element.

The alternate access circuitry may be configured to select a path for accessing the data element depending on a type of software used to operate the network interface. In particular, the pass for accessing the data element is allocated in response to an address signal supplied from the network interface to access a predetermined register, when the network interface operates with a selected type of software that requires the data element to be held in the predetermined register.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING-OUT THE INVENTION

Although the invention has general applicability in the field of data processing, the best mode for practicing the invention is based in part on the realization of a network interface in a packet switched network, such as an Ethernet (IEEE 802.3) network.

Figure 1:
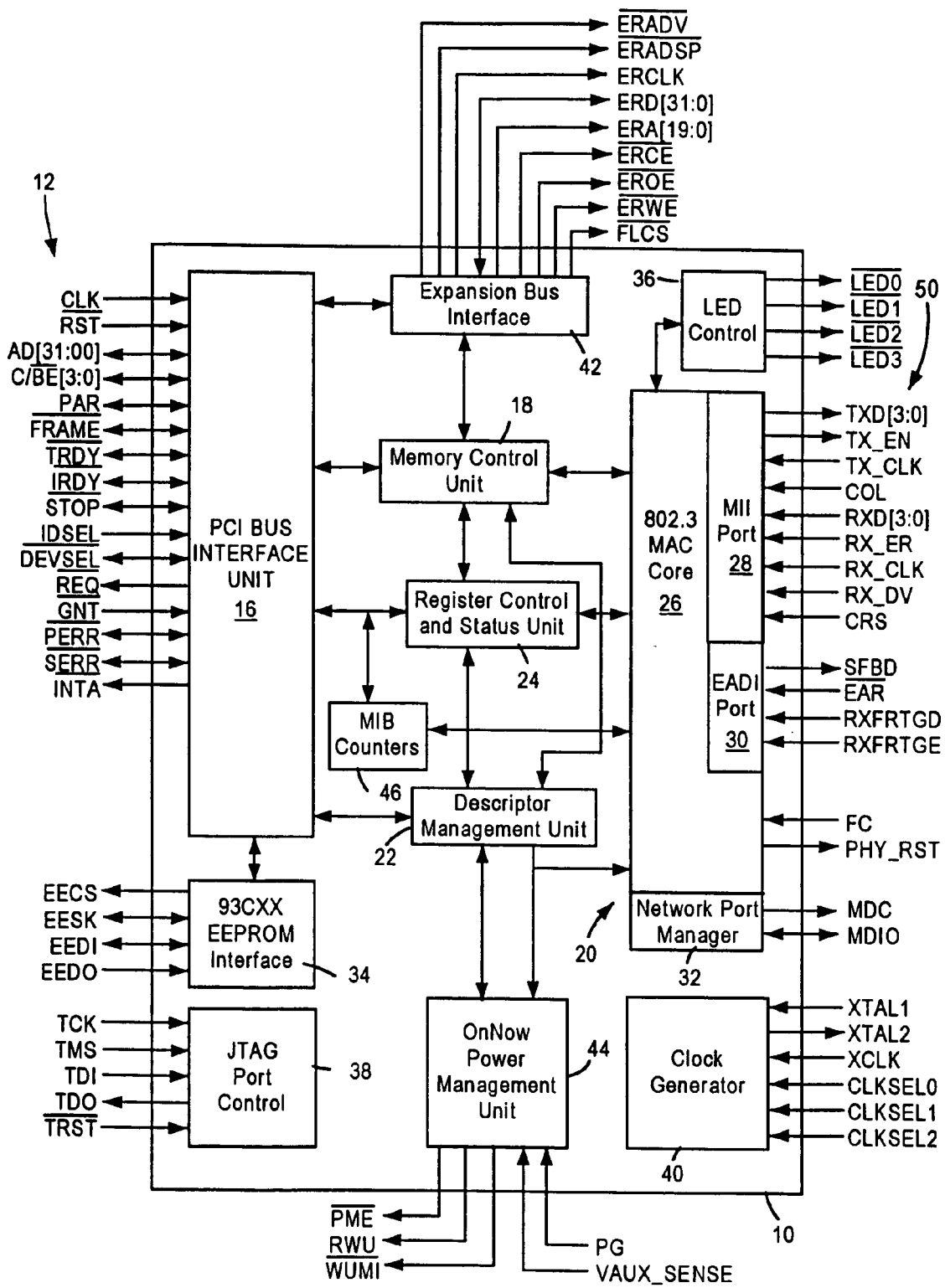
FIG. 1 is a block diagram of an exemplary network interface, in which the present invention may be implemented.

FIG. 1 is a block diagram of an exemplary network interface 10 that accesses the media of an Ethernet network according to an embodiment of the present invention.

The network interface 10, preferably a single-chip, 32-bit Ethernet controller, provides an interface between a local bus 12 of a computer, for example, a peripheral component interconnect (PCI) local bus, and an Ethernet-based media 50. The reference numeral 50 identifies either an actual network medium, or alternately a signal path (e.g., a media independent interface (MII)) to a physical layer transceiver coupled to the network media.

The network interface 10 includes a PCI bus interface unit 16, a memory control unit 18, a network interface portion 20, a descriptor management unit 22 and a register control and status unit 24. The network interface portion 20 includes an IEEE 802.3 compliant and full-duplex capable media access control (MAC) core 26, a Media Independent Interface (MII) port 28 for connecting external 10Mb/s, 100 Mb/s or 1000 Mb/s transceivers, an External Address Detection Interface (EADI) port 30, and a network port manager unit 32. The network interface 10 also includes an EEPROM interface 34 for reading from and writing to an external EEPROM, an LED control 36, an IEEE 1149.1-compliant JTAG Boundary Scan test access port interface 38, a clock generation unit 40, and an expansion bus interface 42. The expansion bus interface unit 42 interfaces to an external or internal data memory (not shown in FIG. 1) for frame storage and also to non-volatile (e.g., EPROM or Flash memory) storage for boot ROM use during startup.

The PCI bus interface unit 16, compliant with the PCI local bus specification (revision 2.2), receives data frames from a host computer memory via the PCI bus 12. The PCI bus interface unit 16, under the control of the descriptor management unit 22, receives transfers from the host computer via the PCI bus 12. For example, transmit data received from the PCI bus interface unit 16 is passed to the memory control unit 18 which stores it in the data memory. Subsequently, the memory control unit 18 retrieves the transmit data from the data memory and passes it to the MAC 26 for eventual transmission to the network. Similarly, receive data from the network 50 is processed by the MAC 26 and passed to the memory control unit 18 for storage in the data memory. Subsequently, the memory control unit 18 retrieves the receive data from the data memory and passes it to the PCI bus interface unit 16 for transfer to the host computer via the PCI bus 12.

The descriptor management unit 22 manages the transfers of data to and from the host computer via the PCI bus interface unit 16. Data structures contained in the memory of the host computer specify the size and location of data buffers along with various control and status information. The descriptor management unit 22 interfaces with the memory control unit 18 to insert control information into the transmit data stream and to retrieve status information from the receive data stream.

The network interface portion 20 includes a network port manager 32 that performs auto-negotiation functions by communicating via the media 50 with a corresponding auto-negotiation unit in the link partner (e.g., a centralized hub, repeater, workstation, or switch).

The network interface 10 also includes a power management unit 44 that enables remote activation (i.e., turn-on) of the host computer via the network medium 50 by detecting a predetermined pattern on the network medium 50 according to Microsoft OnNow and ACPI specifications, including compliance with Magic Packet technology and PCI Bus Power Management Interface Specification protocols.

The network interface 10 also includes a MIB counter unit 46 which accepts information from the MAC 26 regarding frame transmission and reception and maintains the statistics necessary for network management. These statistics are accessed by the host computer via the PCI bus interface unit 16.

In accordance with the present invention, the network interface 10 is enabled to operate with different types of software. Each software type may request that certain bits in registers of the network interface 10, such as control and status bits, be accessed in a specific way. For example, a particular bit is required to be located in a specific position in a particular register along with some other bits accessible during the same access operation or sequence of access operations. The present invention allows the network interface 10 to avoid storing the same information in different registers. Instead, the invention provides two or more ways of accessing certain bits stored in registers of the network interface 10.

As a result, each bit is stored only in a single storage element or a register location. However, alternate accesses are provided to this storage element, depending on the software being employed.

Figure 2:
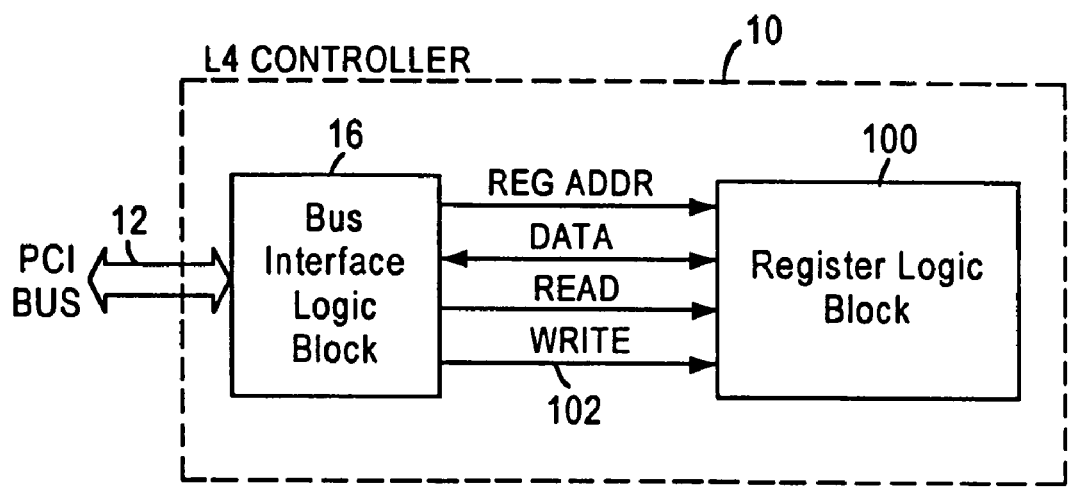
FIG. 2 is a block-diagram illustrating a register access scheme in the network interface.

Referring to FIG. 2, the network interface 10 comprises a register logic block 100 that manages top-level registers of the network interface 10. The register logic block 100 is coupled to the PCI bus interface unit 16 via a register interface 102 to allow read and write accesses to the registers. The PCI bus interface 16 recognizes PCI read and write accesses to the registers, and sends register address signal and write and read signals to the register logic block 100. The register address signal identifies a register being accessed from the PCI bus 12. The write and read signals identify whether a write or read access operation is being performed. Data being written or read to or from the accessed register is transferred via a data bus in the register interface 102.

For example, the register logic block 100 may include a decoder and multiple global registers such as control and status registers, and interrupt registers. The decoder decodes the address of the register being accessed via the PCI bus interface unit 16, and provides access to the selected register. The control and status registers may comprise control bits for controlling some functions of the network interface 10 such as switching into a particular mode of operation, the start or stop of frame transmission or reception, and status bits for indicating the status of certain network interface operations. The interrupt registers may comprise interrupt bits corresponding to various transmit and receive interrupt events. Among transmit interrupt events are transmit descriptor interrupts asserted when a transmit descriptor has been processed, free bytes interrupts asserted when a certain number of bytes become free in the transmit buffer 32a, transmit frame complete interrupts indicating that a transmit frame has been either successfully transmitted to the network or aborted due to error conditions, etc. Receive interrupt events include receive frame complete interrupts indicating that an entire receive frame is processed, receive out-of-descriptor interrupts asserted when the network adapter wants to transfer receive data to the system memory but no receive descriptor is available, etc. The interrupt bits are sent to the PCI bus interface unit 16 for activating the interrupt request output INTA/.

Figure 3:
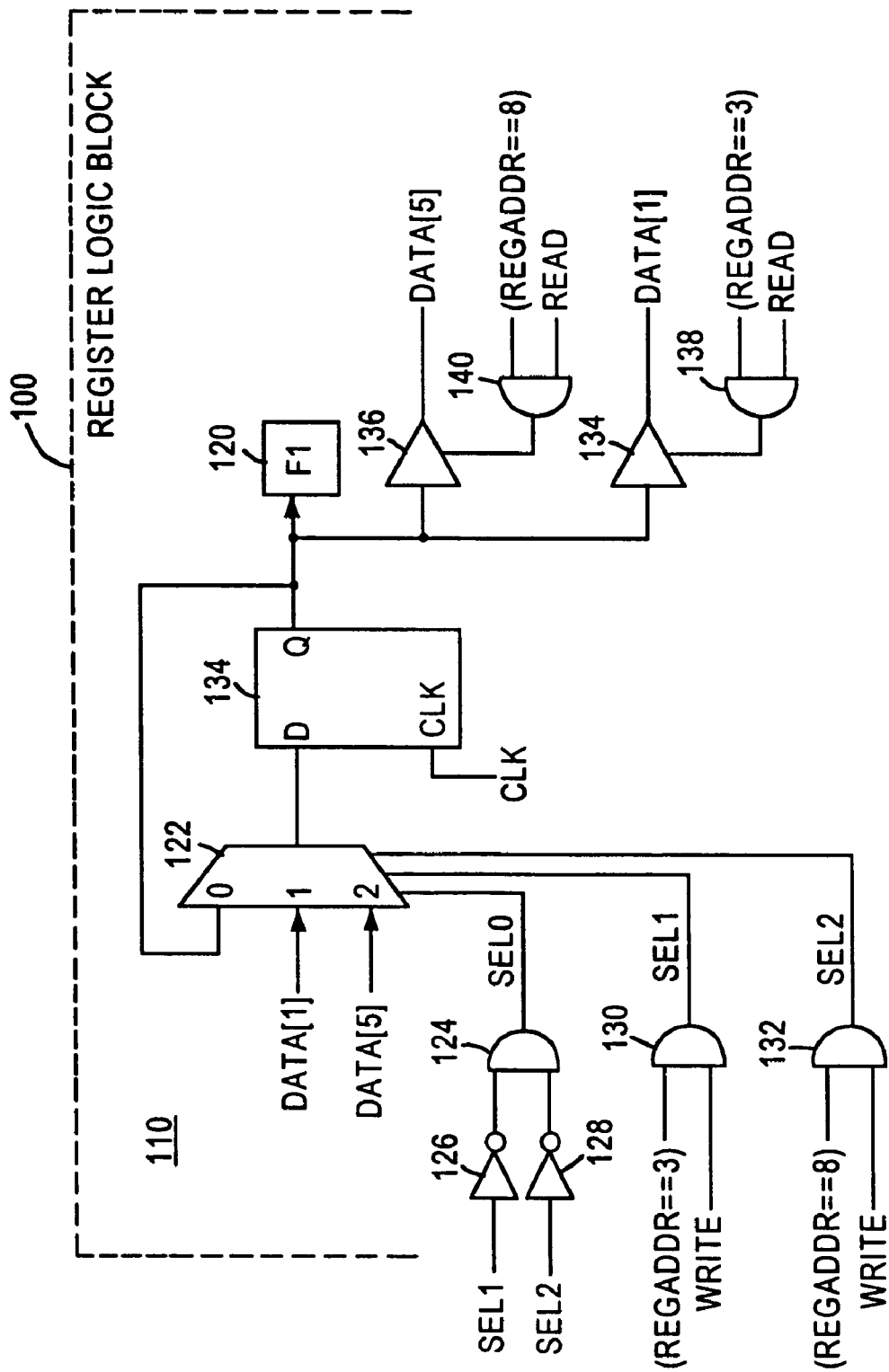
FIG. 3 is a diagram of alternate register access circuitry of the present invention.

In accordance with a disclosed embodiment of the present invention, the register logic block 100 comprises alternate register access circuitry 110 for providing alternate access to certain bits stored in registers of the register logic block 100. FIG. 3 illustrates an exemplary alternate register access circuitry 110 for providing read and write accesses to a storage element 120, such as a flip-flop, that holds the value of a control bit F1. The control bit F1 may be a bit set or cleared by a PCI write access, and used to control some function within the network interface 10. For example, the control bit F1 may be set to instruct the network interface 10 to switch into a particular mode of operation, to start or stop frame transmission or reception, etc.

As illustrated in FIG. 3, the storage element 120 for holding the bit F1 can be accessed in two different ways. First, it can be accessed as a bit arranged in a first register such as register 3, in a first bit position, for example, position 1 of the register 3. Also, this storage element can be accessed as a bit arranged in a second register such as register 8, in a second bit position, for example, position 5 of the register 8. As a result, the bit F1 can be written or read to or from a single storage element when the network interface 10 is controlled by a first type of software that requires this bit to be in the first register, and when the network interface 10 is controlled by a second type of software that requires the bit F1 to be arranged in the second register.

The exemplary alternate register access circuitry 110 shown in FIG. 3 comprises a writing multiplexer 122 having inputs 0, 1 and 2. Data signals DATA[1] and DATA[5] representing data to be written into the storage element 120 are supplied to the inputs 1 and 2, respectively.

The DATA[1] signal represents data being written or read to or from the storage element 120 when the network interface 10 is operated by a first type of software. The DATA[5] signal represents data being written or read to or from the storage element 120 when the network interface 10 is operated by a second type of software. The input 3 is coupled to the storage element 120.

The multiplexer 122 is controlled by controlled signals SEL0, SEL1 and SEL2 respectively asserted to connect the inputs 0, 1 and 2 to the output of the multiplexer 122. The control signal SEL0 is produced at the output of an AND gate 124 supplied with the control signals SEL1 and SEL2 respectively inverted by inverters 126 and 128.

The control signal SEL1 is produced at the output of an AND gate 130 supplied with the write signal and the register address signal identifying access to the register 3. The control signal SEL2 is produced at the output of an AND gate 132 supplied with the write signal and the register address signal identifying access to the register 8. The output of the multiplexer 122 is coupled to the storage element 120 via a D flip-flop 134 provided to synchronize writing access operations.

When the network interface 20 is controlled by the first type of software to write data into the memory element 120, a register address signal identifying the register 3, together with the write signal, is supplied to the register logic block 100. As a result, the control signal SEL1 is asserted to pass the DATA[1] signal to the output of the multiplexer 122. Thus, the control bit F1 is written as a bit in bit position 1 of the register 3.

When the network interface 20 is controlled by the second type of software to write data into the memory element 120, a register address signal identifying the register 8, together with the write signal, is supplied to the register logic block 100. As a result, the control signal SEL2 is asserted to pass the DATA[5] signal to the output of the multiplexer 122. Thus, the control bit F1 is written as a bit in bit position 5 of the register 8.

If no access is performed to write the F1 bit, the control signal SEL0 is asserted to maintain the current value in the storage element 120.

Further, the exemplary alternate register access circuitry 110 comprises first and second reading gates 134 and 136 connected to the storage element 120 for outputting the DATA[1] and DATA[5] signals, respectively. The gates 134 and 136 are controlled by first and second read control signals produced at outputs of AND gates 138 and 140, respectively.

The AND gate 138 is supplied with the read signal and the register address signal identifying register 3, when the network interface 10 is controlled by the first type of software to read the control bit F1. The AND gate 140 is supplied with the read signal and the register address signal identifying register 5, when the network interface 10 is controlled by the second type of software to read the control bit F1.

Thus, when the network interface 10 operates with the first type of software, a read access operation to bit position 1 of the register 3 results in reading the control bit F1 from the storage element 120 as the DATA[5] signal. Similarly, when the network interface 10 operates with the second type of software, a read access operation to bit position 5 of the register 8 results in reading the control bit F1 from the storage element 120 as the DATA[1] signal.

Accordingly, the present invention enables the network interface 10 to operate with different types of software without storing the same information in different locations. Instead, a particular bit accessible via the PCI bus is stored in a single storage element. Alternate register access circuitry provides alternate circuits for accessing this storage element. When the network interface operates with a first type of software, the storage element is being accessed as a first position of a first register. However, when the network interface operates with a second type of software, the storage element is being accessed as a second position of a second register.

Those skilled in the art will recognize that the present invention admits of a number of modifications, within the spirit and scope of the inventive concepts. For example, the alternate register access circuitry may be implemented in a number of different ways.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A data processing system operable with at least two types of software, the system comprising:
   a host interface for providing address, data and control signals from a host,
   a storage element for holding data accessible via the host interface, and
   alternate access circuitry for providing access to the storage element so as to access the data as a first data element in a first register when the system operates with a first type of software, and as a second data element in a second register when the system operates with a second type of software.

2. The system of claim 1, wherein the alternate access circuitry is configured to perform writing data into the storage element in response to a first address signal supplied from the host interface to access the first register, when the system operates with the first type of software.

3. The system of claim 2, wherein the alternate access circuitry is configured to perform writing data into the storage element in response to a second address signal supplied from the host interface to access the second register, when the system operates with the second type of software.

4. The system of claim 1, wherein the alternate access circuitry is configured to perform reading data from the storage element in response to a first address signal supplied from the host interface to access the first register, when the system operates with the first type of software.

5. The system of claim 4, wherein the alternate access circuitry is configured to perform reading data from the storage element in response to a second address signal supplied from the host interface to access the second register, when the system operates with the second type of software.

6. The system of claim 1, wherein the alternate access circuitry comprises a writing multiplexer having a first input for supplying the first data element to the storage element when the system operates with the first type of software, and a second input for supplying the second data element to the storage element when the system operates with the second type of software.

7. The system of claim 6, wherein the writing multiplexer is controlled by a first select signal to pass the first data element to the storage element when the first select signal is asserted.

8. The system of claim 7, wherein the writing multiplexer is controlled by a second select signal to pass the second data element to the storage element when the second select signal is asserted.

9. The system of claim 8, wherein the first select signal is asserted in response to a first address signal supplied from the host interface to access the first register.

10. The system of claim 9, wherein the second select signal is asserted in response to a second address signal supplied from the host interface to access the second register.

11. The system of claim 1, wherein the alternate access circuitry comprises a first reading gate coupled to the storage element for outputting the first data element when the system operates with the first type of software, and a second reading gate coupled to the storage element for outputting the second data element when the system operates with the second type of software.

12. The system of claim 11, wherein the first reading gate is configured to output the first data element in response to a first address signal supplied from the host interface to access the first register.

13. The system of claim 12, wherein the second reading gate is configured to output the second data element in response to a second address signal supplied from the host interface to access the second register.

14. A network interface comprising:
   a host interface for supplying address, data and control signals from a host,
   a storage element for holding a data element accessible via the host interface, and
   alternate access circuitry coupled to the storage element for providing multiple paths for accessing the data element, and configured to select a first path for accessing the data element in a first register when a first type of software is used to operate the network interface, and to select a second path for accessing the data element in a second register when a second type of software is used to operate the network interface.

15. The network interface of claim 14, wherein the path for accessing the data element is allocated in response to an address signal supplied from the network interface to access a predetermined register, when a selected type of software is used to operate the network interface.

16. The network interface of claim 15, wherein the selected type of software requires the data element to be held in the predetermined register.

17. In a data processing system, a method of providing access to a storage element for holding a data element, comprising the steps of:
   accessing the data element via a first access path when a first type of software is used to operate the data processing system, and
   accessing the data element via a second access path when a second type of software is used to operate the data processing system.

18. The method of claim 17, wherein the first access path is allocated in response to a first address signal identifying a first register required by the first type of software to hold the data element.

19. The method of claim 18, wherein the second access path is allocated in response to a second address signal identifying a second register required by the second type of software to hold the data element.

* * * * *